US011755762B2

(12) United States Patent
Seewald et al.

(10) Patent No.: US 11,755,762 B2
(45) Date of Patent: *Sep. 12, 2023

(54) ATTRIBUTE-BASED ENCRYPTION FOR MICROSERVICES

(71) Applicant: Cisco Technology, Inc., San Jose, CA (US)

(72) Inventors: Maik Guenter Seewald, Nuremberg (DE); Robert Edgar Barton, Richmond (CA); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 17/236,936

(22) Filed: Apr. 21, 2021

(65) Prior Publication Data

US 2021/0264047 A1 Aug. 26, 2021

Related U.S. Application Data

(63) Continuation of application No. 16/105,898, filed on Aug. 20, 2018.

(51) Int. Cl.
*G06F 21/62* (2013.01)
*H04L 9/08* (2006.01)
(Continued)

(52) U.S. Cl.
CPC .......... *G06F 21/6218* (2013.01); *G06F 9/445* (2013.01); *G06F 21/62* (2013.01); *H04L 9/0861* (2013.01); *H04L 63/08* (2013.01)

(58) Field of Classification Search
CPC ...... G06F 21/6218; G06F 9/445; G06F 21/62; H04L 9/0861; H04L 63/08
See application file for complete search history.

(56) References Cited

U.S. PATENT DOCUMENTS 8,213,620 B1 * 7/2012 Sussland ............... H04L 9/0894
380/278
9,491,201 B2 ‡ 11/2016 Bagepalli ............. H04L 63/166
(Continued)

FOREIGN PATENT DOCUMENTS

CN 106790185 A ‡ 5/2017
CN 106790185 A 5/2017

OTHER PUBLICATIONS

International Search Report and Written Opinion from the International Searching Authority, dated Jul. 21, 2020, 12 pages, for corresponding International Patent Application No. PCT/US2019/046943.‡

(Continued)

*Primary Examiner* — Jason Chiang
(74) *Attorney, Agent, or Firm* — Polsinelli

(57) ABSTRACT

The disclosed technology provides solutions that enable scalable and secure data retrieval between microservices by using microservice attributes to encrypt container based data stores. A process of the technology can include steps for: instantiating a first microservice and a second microservice in a cloud environment, wherein the first microservice is associated with a first attribute label and the second microservice is associated with a second attribute label, generating a first key based on the first attribute label and a second key based on the second attribute label, associating a first data store with the first microservice, wherein the first data store is encrypted using the first key, and associating a second data store with the second microservice, wherein the second data store is encrypted using the second key. Systems and machine readable media are also provided.

20 Claims, 4 Drawing Sheets

(51) Int. Cl.
*G06F 9/445* (2018.01)
*H04L 9/40* (2022.01)

(56) References Cited

U.S. PATENT DOCUMENTS

| | | | | |
|---|---|---|---|---|
| 9,608,809 | B1* | 3/2017 | Ghetti | H04L 9/0822 |
| 9,838,376 | B1* | 12/2017 | Lander | H04L 67/10 |
| 10,187,200 | B1* | 1/2019 | Firestone | H04L 63/0435 |
| 11,036,876 | B2* | 6/2021 | Seewald | H04L 63/08 |
| 11,132,367 | B1* | 9/2021 | Chud | G06F 16/24554 |
| 2004/0161111 | A1* | 8/2004 | Sherman | H04L 63/06 380/283 |
| 2005/0193203 | A1* | 9/2005 | Freeman | H04L 63/18 713/171 |
| 2007/0112798 | A1* | 5/2007 | Polk | G06F 21/6218 |
| 2011/0145593 | A1* | 6/2011 | Auradkar | H04L 9/0643 713/189 |
| 2014/0108794 | A1* | 4/2014 | Barton | H04L 63/0428 713/165 |
| 2014/0337358 | A1* | 11/2014 | Mitra | G06F 16/24578 707/748 |
| 2015/0358436 | A1* | 12/2015 | Kim | H04L 63/10 370/392 |
| 2016/0036862 | A1* | 2/2016 | Bagepalli | H04L 63/166 726/1 |
| 2016/0044035 | A1* | 2/2016 | Huang | H04L 9/30 726/4 |
| 2016/0171222 | A1* | 6/2016 | Panchbudhe | G06F 21/62 713/193 |
| 2016/0342786 | A1* | 11/2016 | Gerebe | G06F 21/52 |
| 2016/0359965 | A1* | 12/2016 | Murphy | H04L 67/1044 |
| 2017/0249472 | A1* | 8/2017 | Levy | G06F 21/6245 |
| 2017/0374145 | A1* | 12/2017 | Chrysanthakopoulos | G06F 16/23 |
| 2018/0041467 | A1* | 2/2018 | Vats | H04L 9/0891 |
| 2018/0075231 | A1* | 3/2018 | Subramanian | H04L 63/0807 |
| 2018/0083835 | A1* | 3/2018 | Cole | G06F 3/0482 |
| 2018/0109387 | A1* | 4/2018 | Vyas | G06F 8/71 |
| 2018/0183764 | A1* | 6/2018 | Gunda | H04L 63/0281 |
| 2018/0254901 | A1* | 9/2018 | Egorov | H04L 9/0822 |
| 2018/0285009 | A1* | 10/2018 | Guim Bernat | G06F 9/5061 |
| 2018/0351928 | A1* | 12/2018 | Yoo | H04L 63/064 |
| 2018/0373765 | A1* | 12/2018 | Kaliavaradhan | G06F 16/33 |
| 2019/0005223 | A1* | 1/2019 | Messerges | G06F 21/6209 |
| 2019/0173851 | A1* | 6/2019 | Jain | H04L 9/088 |
| 2019/0197148 | A1* | 6/2019 | Engstrand | G06F 16/2365 |
| 2019/0260753 | A1* | 8/2019 | Lewis | H04L 63/102 |
| 2019/0273746 | A1* | 9/2019 | Coffing | G06Q 20/40 |
| 2019/0303187 | A1* | 10/2019 | Vu | G06F 9/45558 |
| 2023/0007976 | A1* | 1/2023 | Sheriff | H04W 64/003 |

OTHER PUBLICATIONS

Atram et al., "A Review Paper on Attribute-Based Encryption Scheme in Cloud Computing," IJCSMC, vol. 6, Issue 5, May 2017, pp. 260-266.‡

\* cited by examiner
‡ imported from a related application

ATTRIBUTE-BASED ENCRYPTION FOR MICROSERVICES

CROSS-REFERENCE TO RELATED APPLICATION

This application is a continuation of U.S. Non-Provisional patent application Ser. No. 16/105,898, filed Aug. 20, 2018, the full disclosure of which is hereby expressly incorporated by reference in its entirety.

BACKGROUND

1. Technical Field

This disclosure relates in general to the field of computer networks and, more particularly, pertains to the use of attribute-based encryption to secure data requests made to microservices (e.g., containers) in a cloud environment.

2. Introduction

Containerized microservices are becoming the preferred method of deploying complex enterprise applications. Rather than build a single monolithic application, container based microservices split the application into multiple smaller interconnected components.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
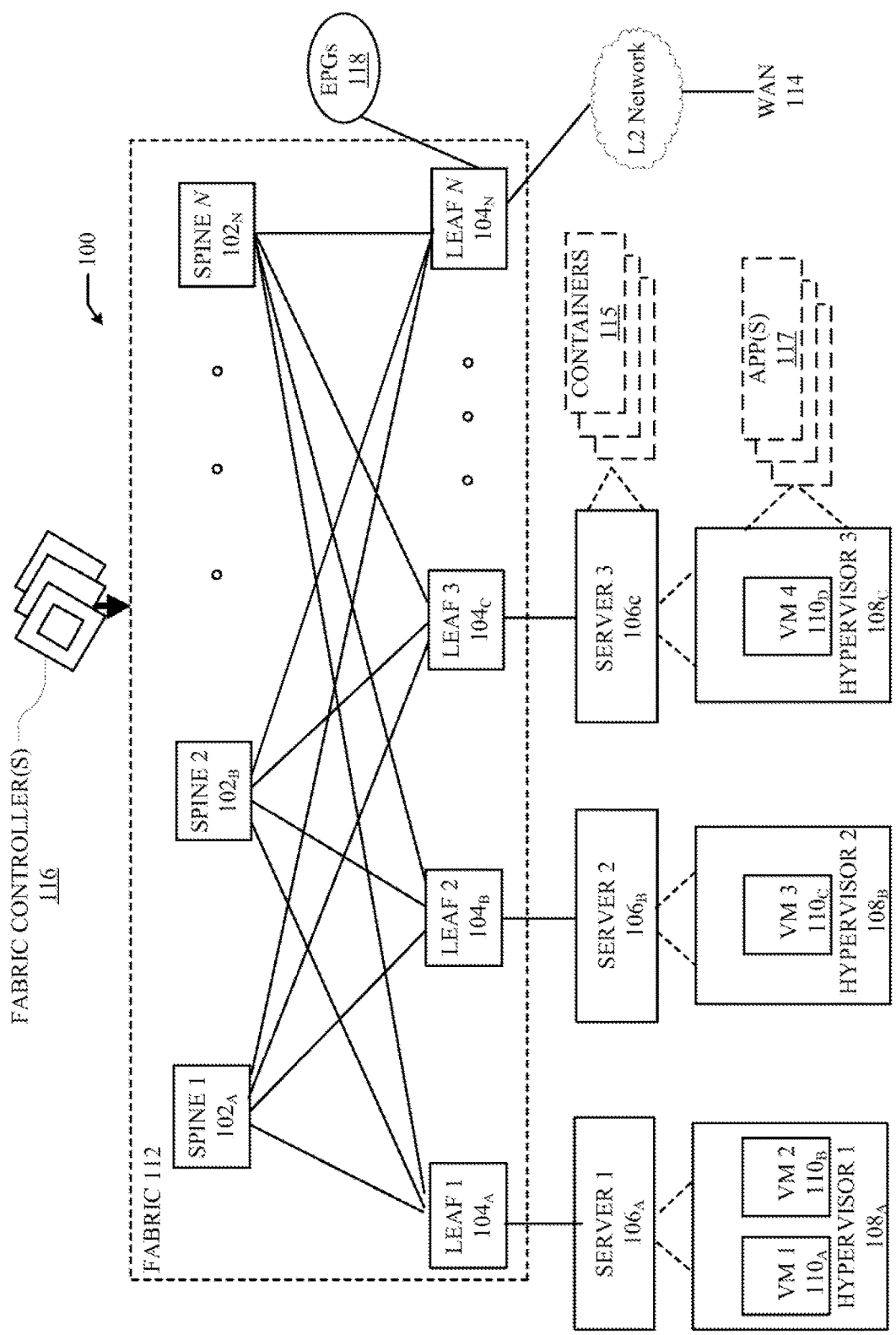
FIG. 1 illustrates an example network environment in which some aspects of the technology can be implemented.

The detailed description set forth below is intended as a description of various configurations of the disclosed technology and is not intended to represent the only configurations in which the technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Additional features and advantages of the disclosure will be set forth in the description which follows, and in part will be obvious from the description, or can be learned by practice of the disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, methods, and computer-readable storage media for enabling scalable and secure data retrieval between microservices, for example, such as between containers in a shared namespace in a cloud networking environment. In some aspects, a key management device (e.g., a server or microservice) can be configured to perform operations for instantiating a first microservice and a second microservice in a shared namespace of a cloud environment, wherein the first microservice is associated with a first attribute label and the second microservice is associated with a second attribute label, and generating a first key based on the first attribute label and a second key based on the second attribute label. In some aspects, the key management server can be further configured to perform and/or facilitate operations for associating a first data store with the first microservice, wherein the first data store is encrypted using the first key, associating a second data store with the second microservice, wherein the second data store is encrypted using the second key, and receiving an application request from a client, wherein the application request requires data retrieval from the first data store and the second data store.

Description

Some conventional microservice encryption schemes make use of public key encryption, which requires generation of unique key pairs for each communicating entity, as well as an out-of-band key distribution means. As such, conventional encryption solutions are not scalable as the number of microservices, and resulting communication mesh between services grows exponentially.

Aspects of the disclosed technology address the foregoing limitations of conventional encryption methods by providing an encryption scheme that permits intra-container access to encrypted data stores using attribute-based keys. In some aspects, a key management device, such as a key management server or microservice, can be used to manage associations between entity attributes, e.g. client or microservice attributes, and encryption keys that unlock corresponding data stores. By using microservice attributes to mediate key generation and encrypted data access, the disclosed technology provides a scalable and highly-granular data protection scheme in which the retrieval of sensitive data can be de-coupled from the security credentials of the requesting entity, for example, by permitting the authorization of secure data request between microservices.

Additional details describing example systems and processes for implementing a microservice attribute-based encryption scheme are provided below. The disclosure now turns to an overview of a network environment in which some aspects of the technology may be implemented, as illustrated in FIG. 1. Specifically, FIG. 1 illustrates an example network environment 100 that contains a network fabric suited for supporting various microservices (e.g., containers) that can be configured to utilize an attribute-based encryption process of the disclosed technology.

Network 100 includes Fabric 112 that represents a physical layer or infrastructure (underlay) of network 100. Fabric 112 includes Spines 102 (e.g., spine routers or switches) and Leafs 104 (e.g., leaf routers or switches) that are interconnected for switching/routing traffic in Fabric 112. Spines 102 interconnect Leafs 104 in Fabric 112, and Leafs 104 connect Fabric 112 to the overlay portion of network 100, which includes application services (APPs 117), servers 106, virtual machines (VMs) 110, containers 115, endpoints, endpoint groups (EPGs) 118, etc. Thus, network connectivity in Fabric 112 can flow from Spines 102 to Leafs 104, and vice versa. Leafs 104 can be, for example, top-of-rack ("ToR") switches, aggregation switches, gateways, ingress and/or egress switches, provider edge devices, and/or any other type of routing or switching device/s.

Leafs 104 can be responsible for routing and/or switching tenant or customer packets and applying network policies. Network policies, such as authentication policies, can be driven by the one or more controllers 116 and/or the Leafs 104. Leafs 104 can connect Servers 106, Hypervisors 108, Virtual Machines (VMs) 110, Containers 115, Applications 117, Endpoints 118, External Routers 114, etc., with Fabric 112. For example, Leafs 104 can encapsulate and decapsulate packets to and from Servers 106 in order to enable communications throughout network 100, including Fabric 112. Leafs 104 can also provide any other devices, services, tenants, or workloads with access to Fabric 112.

VMs 110 can be virtual machines hosted by Hypervisors 108 running on Servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can each host one or more VMs 110. Servers 106 and/or VMs 110 can be configured to host various applications that perform network functionality, such as, by virtualizing various routing, filtering and performing security functions. Network applications can include software applications, services, operators, containers (e.g., containerized microservices) 115, container clusters (e.g., one or more pods) appliances, functions, service chains, etc. For example, Applications 117 can include a firewall, a database, a CDN server, an IDS/IPS, a deep packet inspection service, a message router, a virtual switch, etc.

In some cases, VMs 110 and/or Hypervisors 108 can be migrated to other Servers 106. Servers 106 can similarly be migrated to other locations in the network environment 100. For example, a server connected to a specific leaf can be changed to connect to a different or additional leaf. Such configuration or deployment changes can involve modifications to settings and policies that are applied to the resources being migrated.

In some cases, one or more Servers 106, Hypervisors 108, and/or VMs 110 can represent a tenant or customer space. Tenant space can include workloads, services, applications, devices, and/or resources that are associated with one or more clients or subscribers. Accordingly, traffic in network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, and configuration information between tenants can be managed by one or more controllers 116.

Policies, configurations, settings, etc., in the network can be implemented at the application level, the physical level, and/or both. For example, one or more controllers 116 can define a policy model at the application level which defines policies and other settings for groups of applications or services, such as endpoint groups. In some addition, the Leafs 104, as well as other physical devices such as physical servers or Spines 102, can apply specific policies to traffic. For example, Leafs 104 can apply specific policies or contracts to traffic based on tags or characteristics of the traffic, such as protocols associated with the traffic, applications or endpoint groups associated with the traffic, network address information associated with the traffic, etc.

By way of example, a fabric controller may be implemented using ACI, which can provide an application policy-based solution through scalable distributed enforcement, and support integration of physical and virtual environments under a declarative policy model for networks, servers, services, security, requirements, etc. For example, the ACI framework implements End Point Groups (EPGs), which can include a collection of endpoints or applications that share common policy requirements, such as security, QoS, services, etc. Endpoints can be virtual/logical or physical devices, such as VMs and bare-metal physical servers that are connected to network 100.

Endpoints can have one or more attributes such as VM name, guest OS name, a security tag, etc. Application policies can be applied between EPGs, instead of endpoints directly, for example, in the form of contracts. Leafs 104 can classify incoming traffic into different EPGs. The classification can be based on, for example, a network segment identifier such as a Virtual LAN (VLAN) ID, a Virtual Extensible LAN (VXLAN) Network Identifier (VNID), Network Virtualization using Generic Routing Encapsulation (NVGRE) Virtual Subnet Identifier (VSID), MAC address, IP address, etc.

Network 100 may deploy different hosts via the Leafs 104, Servers 106, Hypervisors 108, VMs 110, and other applications or processes such as containers, controllers, and/or endpoints. By way of example, hosts may be implemented as VMware ESXi hosts, Windows Hyper-V hosts, bare metal physical hosts, etc. Network 100 can interoperate with a wide variety of Hypervisors 108, Servers 106 (e.g., physical and/or virtual servers), SDN orchestration platforms, etc. Network 100 may implement a declarative model to allow its integration with application design and holistic network policy.

Network 100 can include one or more different types of SDN solutions, hosts, etc. For the sake of clarity and explanation purposes, the examples in the following disclosure will be described in the context of an ACI solution implemented in the network 100, and the one or more controllers 116 may be interchangeably referenced as APIC controllers. However, it should be noted that the technologies and concepts herein are not limited to ACI architectures and may be implemented in other architectures and configurations, including other SDN solutions as well as other types of networks which may not deploy an SDN solution.

Further, as referenced herein, the term "hosts" can refer to servers 106 (e.g., physical or logical), Hypervisors 108, VMs 110, containers 115 (e.g., Applications 117), EPGs 118, etc., and can run or include any type of server or application solution. Non-limiting examples of "hosts" can include virtual servers, bare metal physical hosts, VMs, Docker Containers, Virtual Routers/Switches (e.g., VPP), etc. Although containers 115 are illustrated as being instantiated on servers 106 it is understood that one or more of the VMs may be configured to host various containers. Additionally, applications 117, can include or may be composed of software routines running in one or more of containers 115 and/or VMs 110.

Controllers 116 can provide centralized access to fabric information, application configuration, resource configuration, application-level policy modeling for a software-defined network (SDN) infrastructure, integration with management systems or servers, etc. Controllers 116 can form a control plane that interfaces with an application plane via northbound APIs and a data plane via southbound APIs. In some examples, controllers 116 can include SDN controllers or managers, such as an application policy infrastructure controller (APIC).

As previously noted, controllers 116 can define and manage application-level model(s) for policies in the network 100. Application or device policies can also be managed and/or defined by other components in the network. For example, a hypervisor or virtual appliance, such as a container, container cluster, and/or VM can run a server or management tool to manage software and services in network 100, including policies and settings for virtual appliances.

In some aspects, various microservices instantiated in fabric 112 can be configured to store and retrieve encrypted information payloads using an attribute-based encryption process of the disclosed technology. For example, microservices can include one or more containers 115 that are each associated with unique attributes, which can be identified by attribute labels. In some instances, an out-of-band device, such as one of controllers 116, can be used to manage associations between microservice and attribute labels.

In practice, access to encrypted data stores associated with a particular microservice (container) can be restricted based on encryption keys resulting from a combination of one or more attributes, as defined by corresponding labels. For example, an encryption key for a first microservice, can be based on attribute labels corresponding with a service type (e.g., router) and position in a service chain (e.g., fifth service, in a SFC), for the first microservice. As such, access rights granted to the first microservice, e.g., by one or more other microservices, can be controlled by managing data that can be unlocked with the requisite key.

Additional examples of a microservice attribute-based encryption process are detailed with respect to FIG. 2A, FIG. 2B, and FIG. 3, discussed below.

Figure 2A:
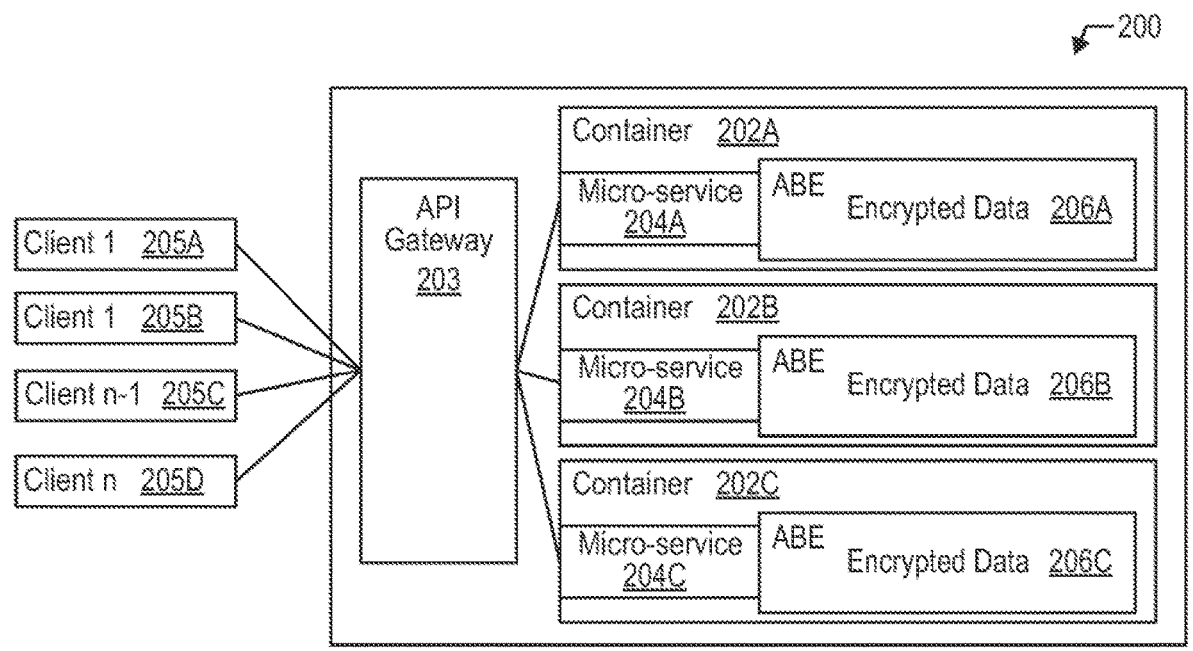
FIG. 2A illustrates an example of a basic architecture in which various microservices are associated with respective encrypted data stores.

In particular, FIG. 2A illustrates an example of a basic architecture 200 in which various microservices are associated with encrypted data stores made available to clients via a gateway. Specifically, architecture 200 includes multiple containers 202 (e.g., containers 202A-202C), that are each associated with a respective microservice 204, and encrypted data store 206. That is, container 202A includes microservice 204A and encrypted data 206A; container 202B includes microservice 204B and encrypted data 206B, and container 202C includes microservice 204C and encrypted data 206C. As depicted, microservices 204 and their associated encrypted data stores 206 are exposed to clients 205 (e.g., Client 1 205A, Client 2, 205B, Client n-1 205C, and Client n 205D) via (API) gateway 203. It is understood that the configuration of FIG. 2A is for illustrative purposes, and that other configurations may be implemented, without departure from the disclosed technology. For example, a greater (or fewer) number of microservices may be implemented. Additionally, containers 202 may be configured to instantiate more than one microservice, that may be associated with more than one encrypted data store, without departing from the scope of the technology.

Attributes associated with the various client devices 205 and microservices 204 can be used to generate keys for accessing encrypted data stores 206. Attribute and attribute label management can be provided by an out of band system, such as a network controller (not illustrated), which maintains associations between various network devices and their attributes, which are identified by corresponding attribute labels. Device attributes can include any type of information that describes a characteristic or quality of a particular device, including a client, container, or microservice, etc. By way of example, client attributes may include without limitation: user access rights, tenant information, network domain information, device type, etc. By way of further example, microservice attributes may include without limitation: service function type, container location, position within a service chain (SFC), microservice priority, data owner (ID), namespace, assigned roll, area of responsibility, department, and/or clearance level, etc.

In practice, both client devices 205 and microservices 204 can access encrypted data stores 206 using attribute-based credentials. That is, client devices 205 can access encrypted data stores 206 given that keys generated from their corresponding attribute labels provide proper authentication credentials for the requested data. Similarly, microservices 204 can access encrypted data stores 206 associated with other microservices, given that keys generated from their associated labels are sufficient to provide proper authentication credentials for the requested data.

Attributed based encryption schemes provide highly granular and scalable secure data access for both clients and microservices, without the need for a key exchange, as would be necessary in a public-key encryption system. Additionally, attribute-based microservice encryption enables applications to function securely by providing the ability for encrypted data to be exchanged by certain microservices to facilitate application execution, without exposing secure data to clients and/or microservices that lack the requisite authentication credentials (attributes).

By way of example, Client 1 205A may execute an application that invokes microservices 204A, 204B, and 204C; however, Client 1 may not have authentication credentials for direct access to encrypted data store 206C. However, encrypted data 206C can be available to microservice 204B, based on attribute labels associated with microservice 204B. In this example, Client 1 205A can successfully execute the application, which requires encrypted data 206C be provided to microservice 204B, without directly receiving data from encrypted data store 206C.

Figure 2B:
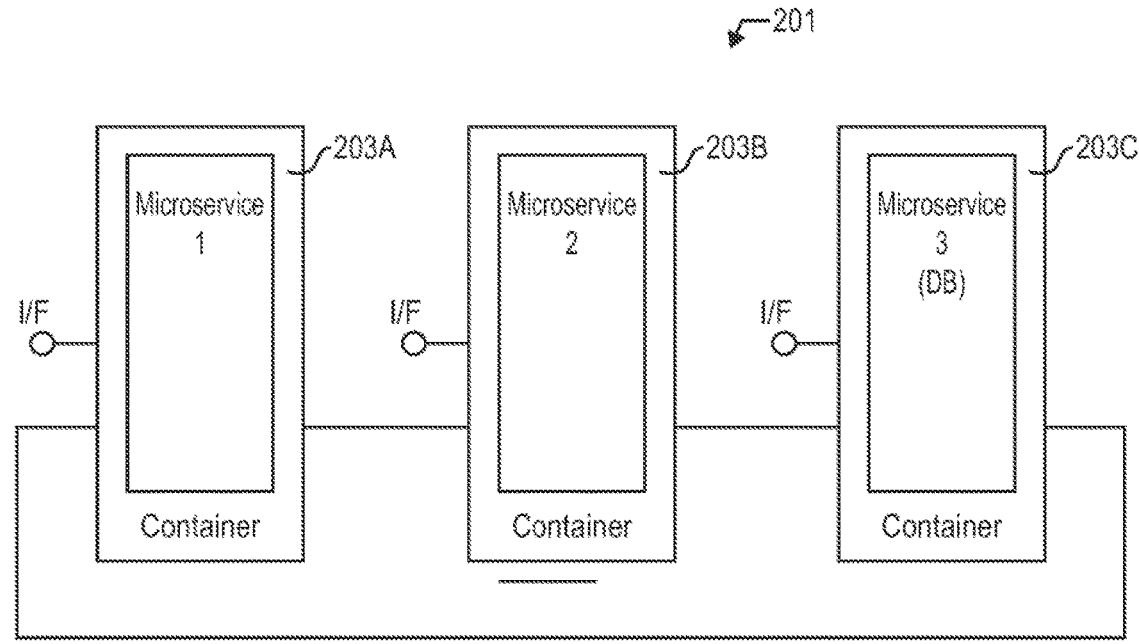
FIG. 2B illustrates an example of a logical relationship between microservices, according to some aspects of the technology.

FIG. 2B illustrates an example architecture 201 of a logical relationship between microservices, according to some aspects of the technology. As illustrated, various microservices (e.g., Microservice 1, Microservice 2, and Microservice 3) are each contained within containers 202, e.g., Container 203A, Container 203B, and Container 203C, respectively.

In some aspects, various microservices can be communicatively connected independent of their ability to retrieve data from one another. For example, Microservice 1 may be associated with attributed labels that permit retrieval of encrypted data from Microservice 2, but not Microservice 3.

Additionally, Microservice 2 may be authorized to retrieve encrypted data from Microservice 1, but not vice versa.

Authentication for access to various encrypted data stores can change as attribute labels for a given device (e.g., client, container, microservice, etc.) are updated by the key management server (not illustrated). In some implementations, network policy updates may affect attribute labeling, such that attribute-based authentication between devices in a shared namespace can be controlled via network policy. In some implementations, a container interface (I/F) can be used by an out-of-band key management server to identify/detect attributes for a given device (container/microservice), and/or to update keys associated with the microservice so that access rights may be updated/managed with respect to other devices.

Figure 3:
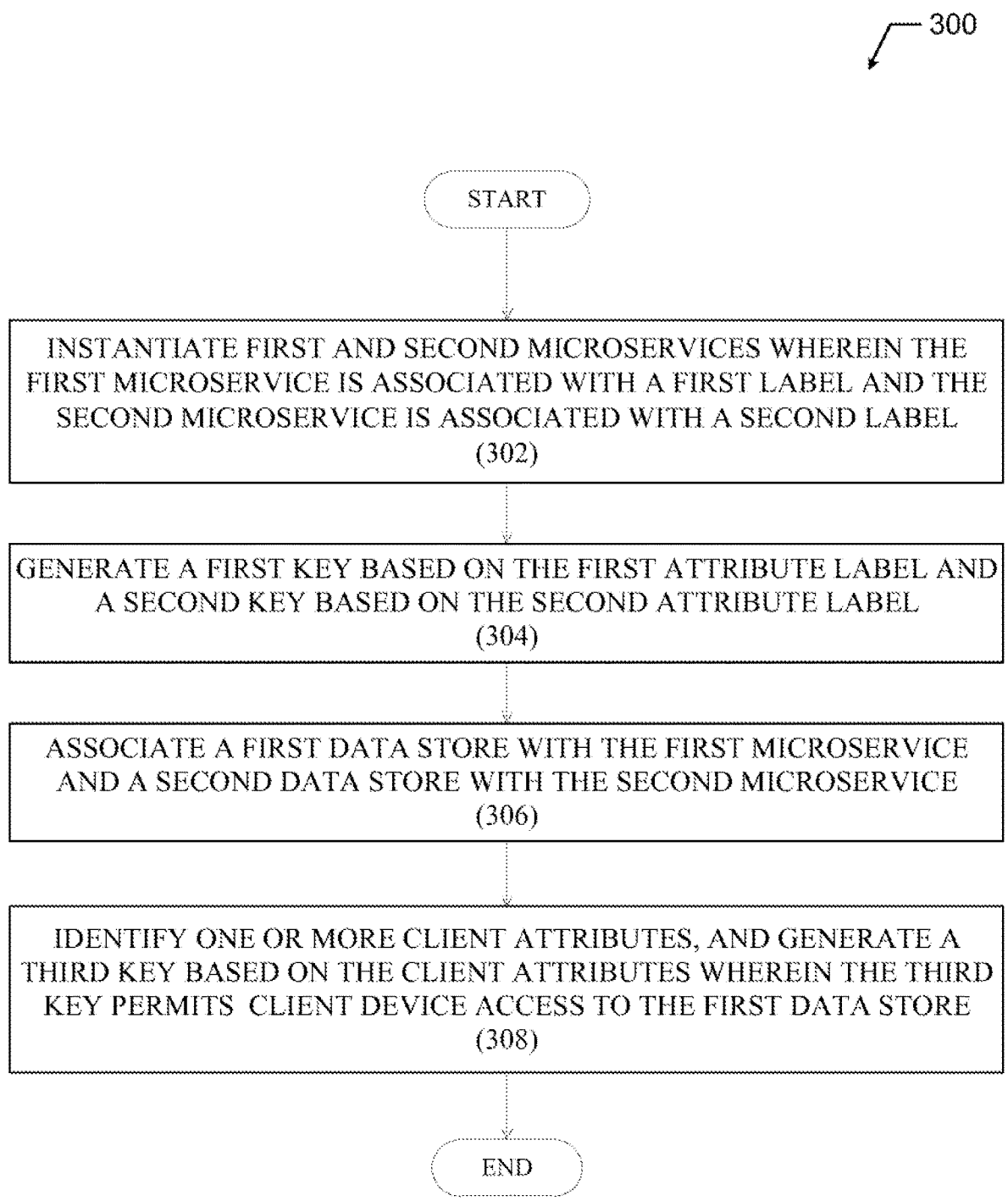
FIG. 3 illustrates steps of an example process for implementing a distributed microservices authentication process of the disclosed technology.

FIG. 3 illustrates steps of an example process 300 for implementing a distributed, attribute-based microservices authentication process of the disclosed technology. Process 300 begins with step 302 in which first and second microservices are instantiated in a cloud environment. In some aspects, the first and second microservices are instantiated in the same namespace; however, the first and second microservices can exist in different namespace locations in the cloud environment, without departing from the technology. By way of example, first and second microservices may be implemented in the same (or different containers), such as those described above with respect to any of FIGS. 1, 2A and/or 2B. Once the microservices are instantiated, both are then associated with respective labels based on their corresponding attributes. As discussed above, attribute detection, labeling, and encryption key management can be performed by an out of band device, such as a key management server, for example, that is implemented by a network controller. In other aspects, attribute labels may be assigned using a network policy, or may be manually configured, for example, by a system or network administrator.

Once attribute labels are identified/generated based on microservice attributes, encryption keys are then generated based on the attribute labels (304). That is, a first key is generated based on the first attribute label (i.e., one or more attribute labels associated with the first microservice), and a second key is generated based on the second attribute label (i.e., one or more attribute labels associated with the second microservice). Encryption keys produced from the associated attribute labels for each device/microservice can be managed by a key management server. In some instances, keys are distributed to prospective devices (microservices), so that authentication can be performed on a microservice-by-microservice basis.

Secure data stores are then associated with each microservice (306). That is, a first data store is associated with the first microservice and a second data store is associated with the second microservice. Each data store can be encrypted using keys generated from attribute labels of its corresponding microservice. That is, the first data store is encrypted using the key generated from attributes associated with the first microservice (i.e., the first microservice attribute labels), and the second data store is encrypted using keys generated based on attributes associated with the second microservice (i.e., the second microservice attribute labels).

As discussed above, attributes and corresponding labels can be associated with any type of network device. That is, attribute labels can be client specific, container specific, and/or microservice specific, etc. In instances where clients (client devices) issue requests for data contained in encrypted stores, a similar attribute-based encryption process is performed. By way of example, one or more client attributes are identified and used to generate a third key based on the client attributes (i.e., associated attribute labels). In some aspects the third key can permit client access to encrypted data, e.g., of the first data store, while also preventing direct access to encrypted data in the second data store (308).

Further to the above examples, the various microservices can also be configured to retrieve or access encrypted data associated with other (different) microservices, e.g., on the basis of their associated attribute labels. For example, the first microservice can be configured to retrieve data from the second microservice, if the second encrypted data store is secured using a key based on attribute labels of the first microservice. In such approaches, a client may execute an application that requires communication and secure data retrieval between microservices, without having direct access to encrypted data that is needed in the application execution.

Figure 4:
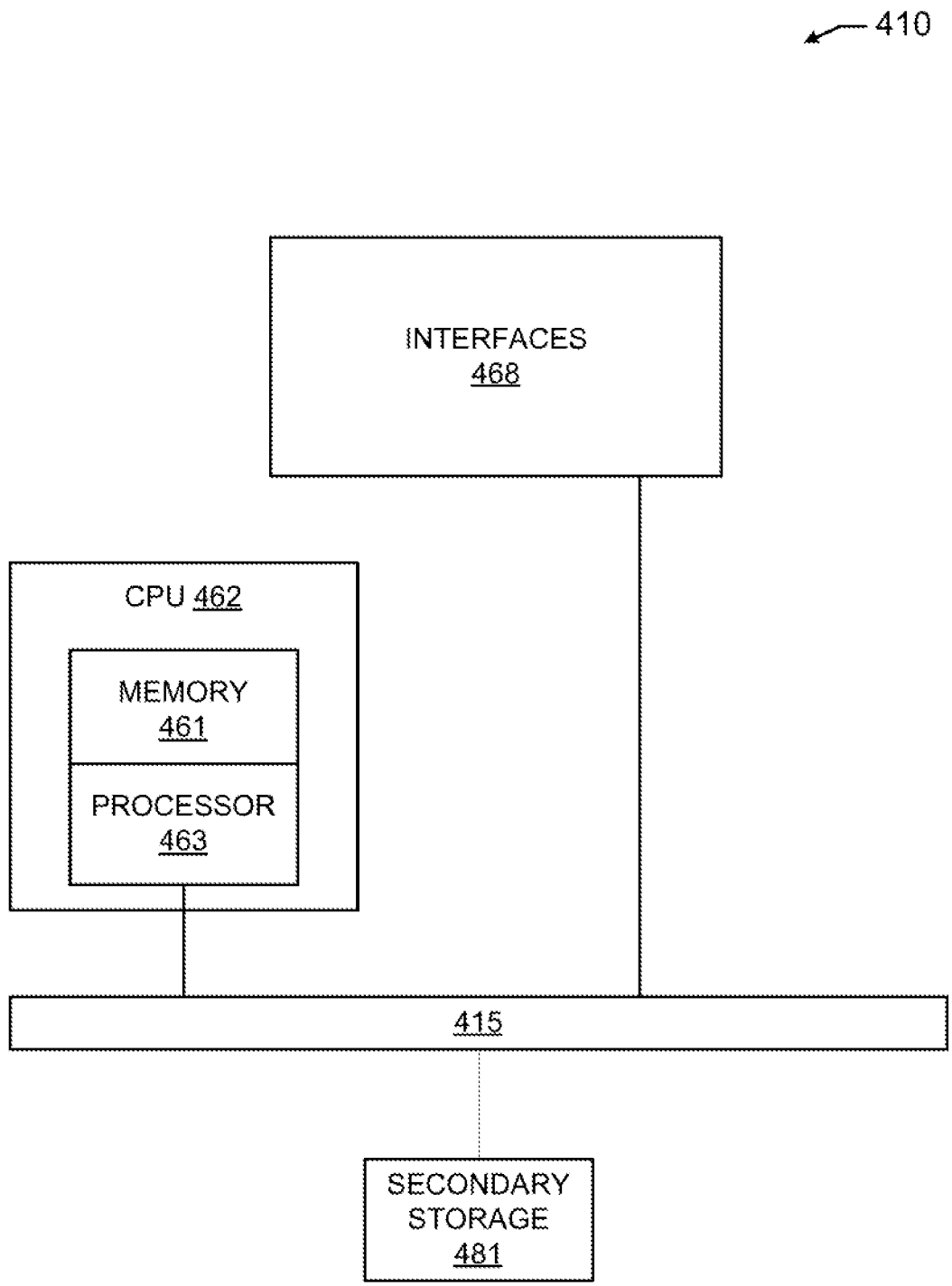
FIG. 4 illustrates an example network device in accordance with various embodiments.

FIG. 4 illustrates an example network device 410 suitable for implementing a microservices attribute-based encryption process of the subject technology. Device 410 includes central processing unit (CPU) 404, network interfaces 468, and a bus 415 (e.g., a PCI bus). When acting under the control of appropriate software or firmware, the CPU 462 is responsible for executing packet management, error detection, and/or routing functions. CPU 462 accomplishes all these functions under the control of software including an operating system and any appropriate applications software. CPU 462 may include one or more processors 408, such as a processor from the INTEL X86 family of microprocessors. In some cases, processor 463 can be specially designed hardware for controlling the operations of network device 410. In some cases a computer-readable memory, e.g., memory 461 (a non-volatile Random Access Memory (RAM), or a Read Only Memory (ROM), etc., also forms part of CPU 462. However, there are many different ways in which memory could be coupled to the system.

Interfaces 468 can be provided as modular interface cards (sometimes referred to as "line cards"). They can control the sending and receiving of data packets over the network and sometimes support other peripherals used with network device 410. Among the interfaces that may be provided are Ethernet interfaces, frame relay interfaces, cable interfaces, Digital Subscriber Line (DSL) interfaces, token ring interfaces, and the like.

In addition, various very high-speed interfaces may be provided such as fast token ring interfaces, wireless interfaces, Ethernet interfaces, Gigabit Ethernet interfaces, ATM interfaces, High Speed Serial Interfaces (HSSIs), POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 404 to efficiently perform routing computations, network diagnostics, security functions, etc.

Although the system shown in FIG. 4 is one specific network device of the disclosed embodiments, it is by no means the only network device architecture on which aspects of the disclosed technology can be implemented. For example, an architecture having a single processor that handles communications as well as routing computations, etc., is often used. Further, other types of interfaces and media could also be used with the network device 410.

Regardless of the network device's configuration, it may employ one or more non-transitory computer readable media, e.g., memories or memory modules, such as, memory 461, and/or secondary storage 481, that are configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 461 could also hold various software containers and virtualized execution environments and data. Additionally, secondary storage 481 may be used as a distributed data store.

In some implementations, the program instructions may be configured to cause CPU 462 and/or processor/s 463 to perform operations for implementing an attribute based microservices encryption scheme of the disclosed technology. For example, CPU 462 and/or processor/s 463 can be configured to implement operations for instantiating a first microservice and a second microservice in a shared namespace of a cloud environment, wherein the first microservice is associated with a first attribute label and the second microservice is associated with a second attribute label, generating a first key based on the first attribute label and a second key based on the second attribute label, associating a first data store with the first microservice, wherein the first data store is encrypted using the first key, and associating a second data store with the second microservice, wherein the second data store is encrypted using the second key. In some aspects, the CPU/processors can be further configured to implement operations for receiving an application request from a client, wherein the application request requires data retrieval from the first data store and the second data store, identifying one or more client attributes associated with the client, and generating a third key based on the client attributes, wherein the third key permits access by the client to at least a portion of the first data store, wherein the third key does not permit the client to access the second data store.

In some aspects, the processors can be further configured to perform operations including generating a derivative application request by the first microservice in response to the application request, wherein the derivative application request comprises a fourth key based on the first attribute label associated with the first microservice, and accessing, by the first microservice, the second data store associated with the second microservice using the fourth key.

In other aspects, the processors can be further configured to perform operations including providing an application response to the client, wherein the application response comprises data from the first data store that is accessed by the client using the third key, and data from the second data store that is accessed by the first microservice using the fourth key.

In some aspects, as discussed above, attribute labels can serve to identify a function type associated with a microservice, such as, the first microservice discussed above. In other approaches, an attribute label (e.g., the second attribute label) identifies a position of the second microservice in a service chain that comprises the first microservice and one or more other microservices.

Network device 410 can also include an application-specific integrated circuit (ASIC), which can be configured to perform routing and/or switching operations. The ASIC can communicate with other components in the network device 410 via the bus 415, to exchange data and signals and coordinate various types of operations by the network device 410, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from non-transitory forms of computer-readable media. Such instructions can comprise, for example, instructions and data which cause or otherwise configure a general purpose computer, special purpose computer, or special purpose processing device to perform a certain function or group of functions.

Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
instantiating a first application service associated with a first attribute label and a second application service associated with a second attribute label in a cloud environment;
generating a first key based on the first attribute label and a second key based on the second attribute label;
associating a first data store with the first application service by encrypting the first data store with the first key, wherein the first application service is configured to access first data stored in the first data store through the first key based on the first attribute label;
associating a second data store with the second application service by encrypting the second data store with the second key, wherein the second application service is configured to access second data stored in the second data store through the second key based on the second attribute label;
receiving from a client an application service request that calls for execution of the first and second application services, said application service request including access credentials for the first data store but lacking access credentials for the second data store; and
filling, based on the first attribute label, the application service request for the first application service from the client by providing the first application service access to the first data store through the first key and the second data store through the second key while refraining from providing the client access to the second data store.

2. The method of claim 1, further comprising filling, based on the second attribute label, an application service request for the second application service from the client by providing the second application service access to the second data through the second key while refraining from providing the client access to the second data.

3. The method of claim 1, wherein the client lacks authentication credentials for directly accessing either or both the first data and the second data.

4. The method of claim 1, wherein the first attribute label and the second attribute label are provided by an out of band system.

5. The method of claim 1, wherein the first attribute label is assigned to the first application service and the second attribute label is assigned to the second application service based on one or more network policies for the cloud environment.

6. The method of claim 1, further comprising:
identifying one or more client attributes associated with the client; and
generating a third key based on the one or more client attributes, wherein the third key permits access by the client to at least a portion of the first data store, and wherein the third key does not permit the client to access the second data store.

7. The method of claim 1, further comprising:
determining whether the second data store is encrypted using a key generated based on an attribute label associated with the first application service; and
providing the first application service access to at least a portion of the second data store based on whether the second data store is encrypted using the key generated based on the attribute label associated with the first application service.

8. The method of claim 1, wherein the first attribute label identifies a function type associated with the first application service.

9. The method of claim 1, wherein the second attribute label identifies a priority of the second application service in a service chain that comprises the second application service.

10. A system comprising:
one or more processors; and
a computer-readable medium comprising instructions stored therein, which when executed by the one or more processors, cause the one or more processors to:
instantiate a first application service associated with a first attribute label and a second application service associated with a second attribute label in a cloud environment;
generate a first key based on the first attribute label and a second key based on the second attribute label;
associate a first data store with the first application service by encrypting the first data store with the first key, wherein the first application service is configured to access first data stored in the first data store through the first key based on the first attribute label;
associate a second data store with the second application service by encrypting the second data store with the second key, wherein the second application service is configured to access second data stored in the second data store through the second key based on the second attribute label;
receive from a client an application service request that calls for execution of the first and second application services, said application service request including access credentials for the first data store but lacking access credentials for the second data store; and
fill, based on the first attribute label, the application service request for the first application service from the client by providing the first application service access to the first data store through the first key and the second data store through the second key while refraining from providing the client access to the second data store.

11. The system of claim 10, wherein the instructions, which when executed by the one or more processors, further cause the one or more processors to fill, based on the second attribute label, an application service request for the second application service from the client by providing the second application service access to the second data through the second key while refraining from providing the client access to the second data.

12. The system of claim 10, wherein the client lacks authentication credentials for directly accessing either or both the first data and the second data.

13. The system of claim 10, wherein the first attribute label and the second attribute label are provided by an out of band system.

14. The system of claim 10, wherein the first attribute label is assigned to the first application service and the second attribute label is assigned to the second application service based on one or more network policies for the cloud environment.

15. The system of claim 10, wherein the instructions, which when executed by the one or more processors, further cause the one or more processors to:
identify one or more client attributes associated with the client; and
generate a third key based on the one or more client attributes, wherein the third key permits access by the client to at least a portion of the first data store, and wherein the third key does not permit the client to access the second data store.

16. The system of claim 10, wherein the instructions, which when executed by the one or more processors, further cause the one or more processors to:
   determine whether the second data store is encrypted using a key generated based on an attribute label associated with the first application service; and
   provide the first application service access to at least a portion of the second data store based on whether the second data store is encrypted using the key generated based on the attribute label associated with the first application service.

17. The system of claim 10, wherein the first attribute label identifies a function type associated with the first application service.

18. The system of claim 10, wherein the second attribute label identifies a priority of the second application service in a service chain that comprises the second application service.

19. A non-transitory computer-readable storage medium comprising instructions stored therein, which when executed by one or more processors, cause the one or more processors to:
   instantiate a first application service associated with a first attribute label and a second application service associated with a second attribute label in a cloud environment;
   generate a first key based on the first attribute label and a second key based on the second attribute label;
   associate a first data store with the first application service by encrypting the first data store with the first key, wherein the first application service is configured to access first data stored in the first data store through the first key based on the first attribute label;
   associate a second data store with the second application service by encrypting the second data store with the second key, wherein the second application service is configured to access second data stored in the second data store through the second key based on the second attribute label;
   receive from a client an application service request that calls for execution of the first and second application services, said application service request including access credentials for the first data store but lacking access credentials for the second data store; and
   fill, based on the first attribute label, the application service request for the first application service from the client by providing the first application service access to the first data store through the first key and the second data store through the second key while refraining from providing the client access to the second data store.

20. The non-transitory computer-readable storage medium of claim 19, wherein the instructions further cause the one or more processors to fill, based on the second attribute label, an application service request for the second application service from the client by providing the second application service access to the second data through the second key while refraining from providing the client access to the second data.

* * * * *